United States Patent
Sakamoto

(10) Patent No.: US 9,573,538 B2
(45) Date of Patent: Feb. 21, 2017

(54) IN-VEHICLE STRUCTURE FOR INVERTER AND BRACKET UNIT FOR INVERTER

(71) Applicant: Toyota Jidosha Kabushiki Kaisha, Toyota-shi Aichi-ken (JP)

(72) Inventor: Yusuke Sakamoto, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 20 days.

(21) Appl. No.: 14/688,305

(22) Filed: Apr. 16, 2015

(65) Prior Publication Data

US 2015/0303660 A1    Oct. 22, 2015

(30) Foreign Application Priority Data

Apr. 21, 2014 (JP) ................. 2014-087319

(51) Int. Cl.
| | |
|---|---|
| H05K 7/02 | (2006.01) |
| H05K 7/04 | (2006.01) |
| B60R 16/023 | (2006.01) |
| B60L 3/00 | (2006.01) |
| B60L 11/14 | (2006.01) |
| B60L 11/18 | (2006.01) |

(52) U.S. Cl.
CPC ......... *B60R 16/0238* (2013.01); *B60L 3/003* (2013.01); *B60L 3/0046* (2013.01); *B60L 11/14* (2013.01); *B60L 11/1803* (2013.01); *B60L 2210/40* (2013.01); *B60L 2270/145* (2013.01); *B60L 2270/147* (2013.01)

(58) Field of Classification Search
USPC ....................... 361/807, 809, 810
See application file for complete search history.

(56) References Cited

U.S. PATENT DOCUMENTS

| | | | | |
|---|---|---|---|---|
| 5,683,166 A | * | 11/1997 | Lutzker ............... | H05B 33/06 250/466.1 |
| 5,810,322 A | * | 9/1998 | Zhao ................. | F25D 23/006 248/606 |
| 6,643,143 B1 | * | 11/2003 | Stewart ............... | H01R 12/707 361/679.58 |
| 8,749,991 B2 | * | 6/2014 | Zielinski ............. | H04B 1/082 361/799 |
| 2003/0065405 A1 | * | 4/2003 | Zhong ............... | G05B 13/0265 700/1 |
| 2011/0058318 A1 | * | 3/2011 | Tsuchida ............ | G11B 33/124 361/679.01 |
| 2014/0311842 A1 | | 10/2014 | Kambayashi et al. | |

(Continued)

FOREIGN PATENT DOCUMENTS

| | | | |
|---|---|---|---|
| GB | 002292434 | * | 2/1996 |
| JP | 11-240396 A | | 9/1999 |

(Continued)

*Primary Examiner* — Hung S Bui
(74) *Attorney, Agent, or Firm* — Dinsmore & Shohl LLP

(57) ABSTRACT

An in-vehicle structure for an inverter includes a bracket, a damping bush, and a braided wire. The bracket is made of a metal plate, and serves as a metal fitting for fixing the inverter to a transmission (a vehicle). The damping bush is fitted between the bracket and either one of a case of the inverter and the transmission. The damping bush is made of an insulator. The braided wire electrically connects the case of the inverter to the transmission. The braided wire is wired along the metal plate of the bracket.

5 Claims, 4 Drawing Sheets

(56) References Cited

U.S. PATENT DOCUMENTS

2015/0283955 A1* 10/2015 Sakamoto ............ F16B 5/0241
  248/636

FOREIGN PATENT DOCUMENTS

| JP | 2004-122871 A | 4/2004 |
| JP | 2008-248936 A | 10/2008 |
| JP | 2012-170219 A | 9/2012 |
| JP | 2013-112042 A | 6/2013 |

* cited by examiner

IN-VEHICLE STRUCTURE FOR INVERTER AND BRACKET UNIT FOR INVERTER

INCORPORATION BY REFERENCE

The disclosure of Japanese Patent Application No. 2014-087319 filed on Apr. 21, 2014 including the specification, drawings and abstract is incorporated herein by reference in its entirety.

BACKGROUND OF THE INVENTION

1. Field of the Invention

The present invention relates to an in-vehicle structure for an inverter configured to supply electric power to a drive motor, and a bracket unit configured to fix an inverter to a vehicle.

2. Description of Related Art

An automobile including an electrically-driven vehicle is generally configured such that a potential of its body is often set to an electric ground potential of an in-vehicle electric apparatus. The in-vehicle electric apparatus is electrically connected to the body, and is maintained equipotential (a ground potential) with the body. Since a case of the electric apparatus is made of a conductive metal in general, if the electric apparatus is fixed to the body or a frame of the vehicle, the electric apparatus is automatically maintained equipotential with the body. Japanese Patent Application Publication No. 11-240396 A describes that it is preferable that a case of an electric apparatus be electrically connected to a body via a wire in addition to conduction by the contact of the case with the body. Note that an "electric apparatus" in the present specification encompasses an engine unit including a sensor operating by electricity, a transmission, a drive motor (and its case), and a battery. Further, in the present specification, in a case where an electric apparatus has been provided in a vehicle such that its case is electrically connected to a body of the vehicle, and another electric apparatus is fixed to the electric apparatus, the another electric apparatus should be electrically connected to the case of the electric apparatus that has been already provided in the vehicle. Hence, the electric apparatus that has been already provided in the vehicle is considered as a part of the body electrically.

Japanese Patent Application Publication No. 2004-122871 (JP 2004-122871 A) describes that it is preferable to connect a battery or an engine to a body of a vehicle by use of a braided wire rather than a thin wire. In the following description, a "body of a vehicle" is just referred to as the "body."

SUMMARY OF THE INVENTION

The inverter configured to supply electric power to the drive motor in the electrically-driven vehicle deals with large electric power, and generates relatively strong electromagnetic noise (radio noise). In order to restrain the electromagnetic noise, it is desirable that a metal inverter case be electrically connected to the body so as to maintain its potential at a ground potential. In the meantime, in order to restrain vibration applied to the inverter from the vehicle, the inverter may be provided in the vehicle via a damping bush. Typically, when the inverter is fixed to an engine unit or a transmission, which serves as a source of vibration, the damping bush is used. Generally, a main body of the damping bush is made of insulating rubber, and therefore, if the damping bush is used, the case of the inverter is electrically insulated from the body. In this case, as described in JP 11-240396 A and JP 2004-122871 A, it is conceivable that the case of the inverter is connected to the body via a wire or a braided wire.

The inverter configured to supply current to the drive motor generates large electromagnetic noise. In view of this, in order to effectively restrain high frequency noise, an inductance of a conductive material that connects the inverter to the body should be lowered. The present specification provides such a technique that, when an inverter is fixed to a vehicle by use of a damping bush, an inductance of a conductive material configured to electrically connect a case of the inverter to a body together with a fixing structure (an in-vehicle structure) for the inverter is reduced.

According to one technique described in the present specification, it is possible to embody an in-vehicle structure for an inverter configured to supply electric power to a drive motor. The technique can reduce an inductance of a conductive material configured to electrically connect a case of the inverter to a body by ingeniously using a bracket to be used for fixing the inverter. The in-vehicle structure employs a bracket made of a metal plate, so as to fix the inverter. A damping bush is fitted between the bracket and either one of the case of the inverter and the body. As described above, the damping bush is generally made of an insulator. A braided wire is used to electrically connect the case of the inverter to the body. In the in-vehicle structure described in the present specification, the braided wire is wired along the metal plate of the bracket. Note that the "vehicle" to which the inverter is fixed encompasses not only the body of the vehicle and a frame thereof but also an engine unit and a transmission that have been already fixed to the frame and are maintained equipotential with the body. That is, the in-vehicle structure of the present specification includes fixing the inverter to the engine unit or the transmission.

When high-frequency current flows through the braided wire and a magnetic field occurs around the braided wire, induction current flows through the metal plate of the bracket along the braided wire. The induction current generates a magnetic field. The magnetic field of the induction current is in a reverse direction to the magnetic field of the braided wire, so as to offset the magnetic field of the braided wire. When the magnetic field of the braided wire is offset, an inductance of the braided wire is reduced. The technique described in the present specification reduces the inductance of the braided wire by use of the metal plate of the bracket for fixing the inverter.

It is preferable that the damping bush be fitted between the case and the bracket, not between the vehicle and the bracket. It is preferable that one end of the braided wire be electrically connected to the case, and the other end thereof be electrically and mechanically connected to the bracket, not to the vehicle. According to this configuration, in a step of attaching the bracket to the vehicle after the bracket, the damping bush, and the braided wire are assembled to the inverter, mechanical fixation of the inverter and electrical connection thereof to the vehicle can be achieved at the same time. Note that the one end of the braided wire may be electrically connected to the case, but it is preferable that the one end of the braided wire be mechanically fixed to a metal fitting joined to the main body of the damping bush so as to be electrically connected to the case via the metal fitting, as described below.

The damping bush often includes a bush main body made of an insulator, and a metal fitting made of metal, joined to the bush main body and making contact with the case (or a vehicle-side structure). In this case, it is preferable that the one end of the braided wire be electrically and mechanically connected to the metal fitting of the damping bush, and the other end thereof be electrically and mechanically connected to the bracket. That is, it is preferable that the bracket, the damping bush, and the braided wire be assembled in advance before they are attached to the case of the inverter, so as to constitute one unit. When the bracket, the damping bush, and the braided wire are unitized, it is possible to simplify an assembling operation of the bracket, the damping bush, and the braided wire to the case of the inverter.

The above unit (a bracket unit) is collectively expressed as follows. The unit is a device for fixing, to a vehicle, an inverter configured to supply electric power to a drive motor. The bracket unit includes a first fixing portion, a second fixing portion, a connection portion, a bush main body, and a metal fitting. The first fixing portion, the second fixing portion, and the connection portion are made of a metal plate. The first fixing portion and the second fixing portion correspond to a part fixed to the case of the inverter and a part fixed to the vehicle, respectively. The connection portion is configured to connect the first fixing portion to the second fixing portion. That is, the first fixing portion, the second fixing portion, and the connection portion correspond to the aforementioned bracket. The connection portion corresponds to a part maintained at a position where the inverter is distanced from the vehicle.

In the meantime, the bush main body is made of insulating rubber. The bush main body is attached to the first fixing portion. The metal fitting made of metal is joined to the bush main body on an opposite side to the first fixing portion. In other words, the first fixing portion is fixed to one end of the bush main body, and the metal fitting is joined to the other end thereof. The first fixing portion does not make direct contact with the metal fitting. One end of the braided wire is electrically and mechanically connected to the metal fitting. The other end of the braided wire is electrically and mechanically connected to the bracket (that is, the first fixing portion, the second fixing portion, or the connection portion). At this time, the braided wire is connected to the bracket along the connection portion.

When the bracket unit is used, the metal fitting makes contact with the case of the inverter (or the vehicle). Vibration of the vehicle is absorbed by the bush main body between the first fixing portion and the metal fitting. The bracket unit achieves mechanical fixation and electrical connection of the inverter to the vehicle at the same time. It is not necessary to individually perform fixation and electrical connection of the inverter. Note that the braided wire is flat, and a flat surface thereof is preferably opposed to the metal plate (the connection portion) of the bracket. When the flat braided wire faces the flat bracket, induction current is easy to occur in the bracket, so that the inductance of the braided wire is restrained effectively.

According to the technique described in the present specification, it is possible to reduce the inductance of the braided wire that electrically connects the inverter to the vehicle, and to fix the inverter to the vehicle via the damping bush. Technical details described in the present specification and further improvements thereof are described in the following "DETAILED DESCRIPTION OF EMBODIMENTS".

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
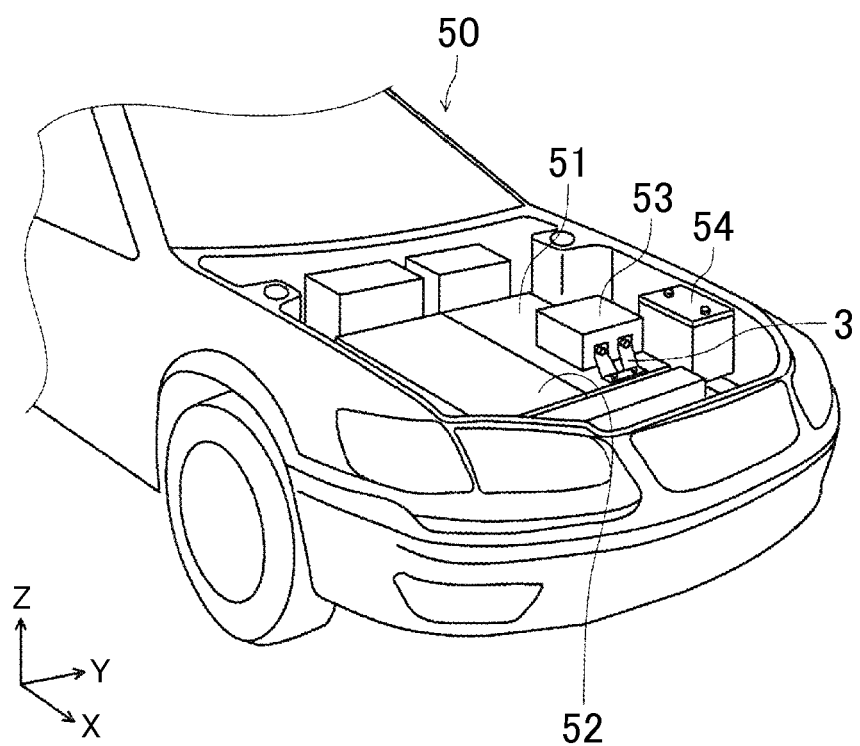
FIG. 1 is a perspective view illustrating a device layout in an engine compartment.

The following describes an in-vehicle structure for an inverter according to an embodiment with reference to the drawings. First described is an example of a device layout in an engine compartment of an electrically-driven vehicle. The electrically-driven vehicle in the present embodiment is, more specifically, a hybrid vehicle including an engine and a motor for driving. FIG. 1 is a perspective view illustrating a device layout in an engine compartment 50 of the hybrid vehicle. The engine compartment 50 on a vehicle front side is provided with an engine 52, a transmission 51 including a motor and gears therein, a sub-battery 54, and an inverter 53 configured to convert electric power of a main battery (not shown) into alternating current so as to supply the alternating current to the motor. Note that other various devices are provided in the engine compartment 50, but those devices are not illustrated herein. The engine 52 and the transmission 51 are fixed to a side frame (not shown) extending in a front-rear direction of the vehicle.

An output voltage of a main battery (not shown) configured to supply electric power to the motor is 100 V or more. In the meantime, the sub-battery 54 supplies electric power to low-electric-power devices such as an electronic component and an audio device, so its output voltage is 10 to 30 V. Similarly to many vehicles, the hybrid vehicle is configured such that a negative electrode of the sub-battery 54 is electrically connected to a vehicle body. That is, the whole vehicle body is maintained at a ground potential. The body is fixed to the side frame (not shown) that maintains strength of the vehicle body. The side frame is also maintained at a ground potential. Since a case of the engine 52 and the transmission 51 fixed to the side frame is made of conductive metal, the case of those devices is also maintained at a ground potential.

The inverter 53 supplies alternating-current power to a drive motor (not shown) provided in the transmission 51. In order to shorten a length of a power cable for transmitting electricity to the motor, the inverter 53 is provided on the transmission 51. In order that a case of the inverter 53 does not make direct contact with the transmission, the inverter 53 is fixed to the transmission 51 via a bracket 3. Note that the bracket 3 attached to a front surface of the inverter 53 is illustrated in FIG. 1. A rear surface of the inverter 53 is also fixed by a similar bracket.

Figure 2:
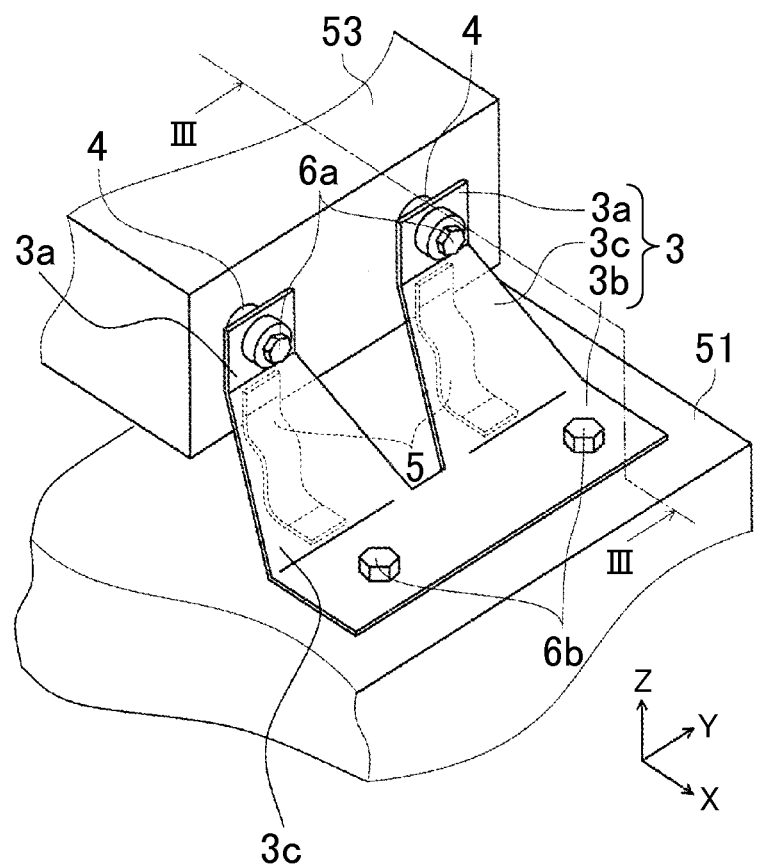
FIG. 2 is an enlarged perspective view around a bracket configured to fix an inverter.

FIG. 2 is an enlarged perspective view around the bracket 3 on a front side of the inverter. Note that the transmission 51 and the inverter 53 are only partially illustrated. The bracket on the rear side of the inverter has the same structure. The following generally describes an in-vehicle structure 2 of the inverter 53. The inverter 53 is fixed by the bracket 3 so as to be distanced from a top face of the transmission 51. The bracket 3 includes a damping bush 4. This is to prevent vibration of the transmission 51 from being transmitted to the inverter 53. A main body of the damping bush 4 is made of insulating rubber. Accordingly, in order to maintain the case of the inverter 53 at a ground potential, the case of the inverter 53 is electrically connected to the transmission 51. A braided wire 5 electrically connects the case of the inverter 53 to the transmission 51. The inverter 53 includes many devices through which heavy-current to be supplied to the motor flows, and the devices generate high frequency noise (radio noise). In order to effectively restrain the high frequency noise, it is preferable that the case of the inverter 53 be connected to the transmission 51 by use of the braided wire 5 having a low inductance. The in-vehicle structure of the embodiment is configured to further decrease the inductance of the braided wire 5 by ingeniously using the bracket 3, as will be described later in detail.

Figure 3:
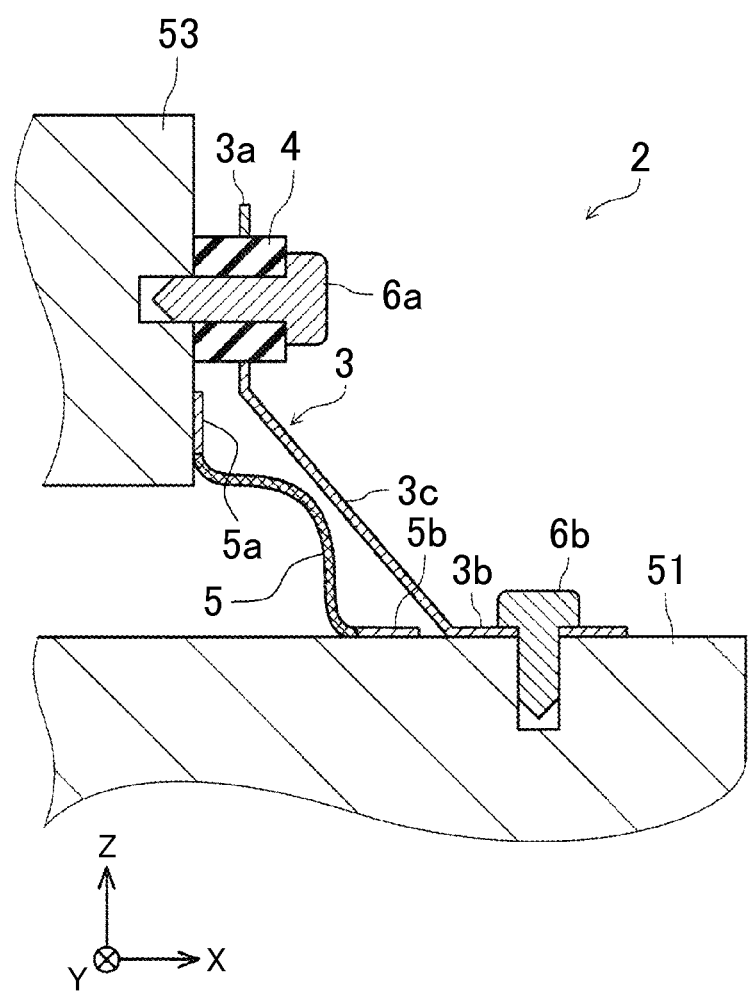
FIG. 3 is a sectional view taken along a line III-III in FIG. 2.

The following describes the in-vehicle structure for the inverter 53, more specifically. With reference to FIG. 2 and a sectional view of FIG. 3, the following describes the in-vehicle structure. Note that FIG. 3 is a sectional view taken along a line III-III in FIG. 2, and is a view crossing the bracket 3, the damping bush 4, and the braided wire 5. Further, in FIG. 3, an inner structure of the inverter 53 and an inner structure of the transmission 51 are not illustrated.

The whole bracket 3 is made of a single metal plate. However, from the viewpoint of functions, the bracket 3 is divided into an inverter side fixing portion 3a, a transmission side fixing portion 3b, and a connection portion 3c. The connection portion 3c connects the inverter side fixing portion 3a to the transmission side fixing portion 3b. As well illustrated in FIG. 2, two connection portions 3c are extended from one transmission side fixing portion 3b, and respective inverter side fixing portions 3a are continued from respective tips of the connection portions 3c. The two connection portions 3c have the same structure, and the two inverter side fixing portion 3a have the same structure.

The transmission side fixing portion 3b is a part making contact with the transmission 51, and is fixed thereto by bolts 6b. The inverter side fixing portion 3a is a part for fixing the inverter 53. However, the inverter side fixing portion 3a does not make direct contact with the case of the inverter 53. The inverter side fixing portion 3a fixes the inverter 53 via the damping bush 4. More specifically, the inverter side fixing portion 3a has a hole through which the damping bush 4 passes, and the cylindrical damping bush 4 is fixed to the inverter side fixing portion 3a outside the hole. A bolt 6a passes through a center of the damping bush 4, and thus, the damping bush 4 is fixed to the case of the inverter 53. As well illustrated in FIG. 3, the bracket 3 (the inverter side fixing portion 3a) supports the inverter 53 via the insulating damping bush 4, so that the inverter 53 is electrically insulated from the transmission 51 without the braided wire 5.

The braided wire 5 is formed by braiding many copper wires, and is generally formed in a flat shape. One end 5a of the braided wire 5 is electrically and mechanically connected to the inverter 53, and the other end 5b thereof is electrically and mechanically connected to the transmission 51. More specifically, the one end 5a of the braided wire 5 is connected to the inverter 53 in a gap between the case of the inverter 53 and the bracket 3. The other end 5b of the braided wire 5 is connected to the transmission 51 in the gap between the transmission 51 and the bracket 3. Hence, as well illustrated in FIGS. 2, 3, the braided wire 5 is wired along a metal plate of the connection portion 3c of the bracket 3. The braided wire 5 is flat, and is wired such that a flat surface thereof is opposed to a flat surface of the metal plate of the connection portion 3c. As has been described earlier, two connection portions 3c are extended from one transmission side fixing portion 3b of the bracket 3, and two braided wires 5 are wired along respective connection portions 3c.

The following describes an advantage of the in-vehicle structure for the inverter according to the embodiment. In the in-vehicle structure for the inverter according to the embodiment, the inverter 53 is fixed to the transmission 51 by the bracket 3 via the damping bush 4. Note that the transmission 51 can be regarded as a part of the vehicle body electrically. On the other hand, the braided wire 5 electrically connecting the case of the inverter 53 to the transmission 51 is wired along the bracket 3 that supports the inverter 53. Note that, as described above, since the transmission 51 is electrically connected to the vehicle body, the braided wire 5 electrically connects the case of the inverter 53 to the vehicle body. The braided wire 5 is wired along the metal plate of the bracket 3 that supports the inverter 53. The metal plate of the bracket 3 is conductive. Accordingly, when high-frequency current flows through the braided wire 5 due to noise generated from the inverter 53, a magnetic field occurs due to the current. Further, due to the magnetic field, induction current flows through the metal plate of the bracket 3. The induction current generates a magnetic field, which cancels the magnetic field of the braided wire 5. A magnitude of a magnetic field generated from a lead wire is one cause to determine a magnitude of an inductance. Accordingly, when the metal plate of the bracket 3 cancels the magnetic field (part thereof) of the braided wire 5, it is possible to restrain the inductance of the braided wire 5. The in-vehicle structure for the inverter according to the embodiment restrains the inductance of the braided wire 5 by use of the bracket 3. Since the inductance of the braided wire 5 electrically connecting the case of the inverter 53 to the vehicle body is restrained, it is possible to reduce high-frequency electromagnetic noise generated from the inverter 53.

Figure 4:
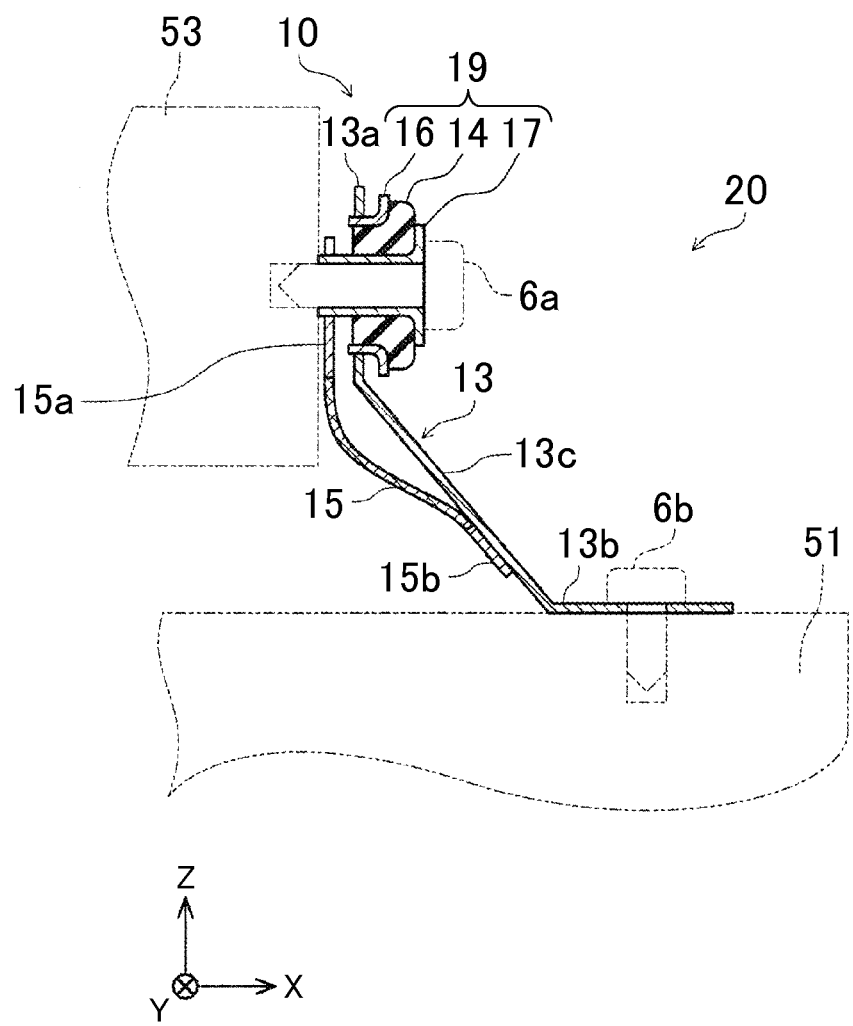
FIG. 4 is a sectional view of a bracket unit.

Referring now to FIG. 4, the following describes a bracket unit 10 suitable for the aforementioned in-vehicle structure for the inverter. FIG. 4 is a view to describe an in-vehicle structure 20 using the bracket unit 10, and illustrates a section of the bracket unit 10. The bracket unit 10 integrates a metal bracket for fixing the inverter 53, and a damping bush. FIG. 4 is a view in which the bracket 3 and the damping bush 4 in FIG. 3 are replaced with the bracket unit 10. For easy understanding of the view, devices except the bracket unit 10 are indicated by virtual lines in FIG. 4.

The bracket unit 10 is configured by combining a bracket 13, a damping bush 19, and a braided wire 15. The bracket 13 is constituted by an inverter side fixing portion 13a fixed to the case of the inverter 53, a transmission side fixing portion 13b fixed to the transmission 51, and a connection portion 13c for connecting the inverter side fixing portion 13a to the transmission side fixing portion 13b. The inverter side fixing portion 13a, the transmission side fixing portion 13b, and the connection portion 13c are made of one metal plate.

The damping bush 19 is constituted by a bush main body 14 made of insulating rubber, and an inner ring 17 and an outer ring 16 joined to the bush main body 14 so as to sandwich the bush main body 14. The inner ring 17 is electrically insulated from the outer ring 16.

The outer ring 16 is joined to an outer circumference of the bush main body 14. The inverter side fixing portion 13a of the bracket is joined to the outer ring 16. The inner ring 17 passes through a center of the bush main body 14, and its tip abuts with the case of the inverter 53. A bolt 6a passes inside the inner ring 17, so that the damping bush 19 is fixed to the inverter 53. The outer ring 16 is joined to one end of the insulating bush main body 14, and the inner ring 17 is joined to the bush main body 14 on an opposite side to the outer ring 16. That is, the outer ring 16 is joined to the inverter side fixing portion 13a via the bush main body 14, and the inner ring 17 makes contact with the case.

One end 15a of the braided wire 15 is electrically and mechanically connected to the inner ring 17 of the damping bush 19, and the other end 15b is electrically and mechanically connected to the connection portion 13c of the bracket 13. As well illustrated in FIG. 4, the braided wire 15 is provided along the connection portion 13c of the bracket.

One bracket unit 10 is constituted by the damping bush 19, the bracket 13, and the braided wire 15. Accordingly, when the inverter 53 is fixed onto the transmission 51, it is not necessary to attach the braided wire that electrically connects, to the transmission 51 (the vehicle body), the inverter 53 and the bracket for fixing the inverter 53, separately. When the inverter 53 is fixed to the transmission 51 by use of the bracket unit 10, the inverter 53 is electrically connected to the transmission 51 in accompany with the fixation. The bracket unit 10 can restrain cost of operation to fix the inverter and to electrically connect the inverter to the vehicle body.

Below are notes regarding the technique explained in the embodiment. The braided wire 5 illustrated in FIGS. 2 and 3 is configured such that one end thereof is electrically and mechanically connected to the inverter, and the other end thereof is electrically and mechanically connected to the transmission 51. The braided wire 15 illustrated in FIG. 4 is configured such that one end thereof is electrically and mechanically connected to an inverter-side metal fitting (the inner ring 17) of the damping bush 19, and the other end thereof is electrically and mechanically connected to the bracket 13. As an aspect obtained by combining both of the above configurations, one end of a braided wire may be electrically and mechanically connected to a case of an inverter, and the other end thereof may be connected to a bracket. In such an aspect, when a transmission side fixing portion of an assembly in which a damping bush and the bracket are attached to the inverter is fixed to the transmission, the inverter is electrically connected to a transmission (a vehicle body). That is, a single operation to connect the braided wire to the transmission (the vehicle body) becomes needless.

In the in-vehicle structure of the embodiment, the damping bush 4 (19) is fitted between the bracket 3 (13) and the inverter 53. It is preferable for the damping bush to be fitted between the bracket and the inverter, but the damping bush may be fitted between the bracket and the vehicle (the transmission).

The structure of the bracket unit 10 in FIG. 4 can be expressed as follows. The damping bush 19 includes the bush main body 14 and the metal fitting (the inner ring 17). The bush main body 14 is made of an insulator, and is attached to an end part (the inverter side fixing portion 13a) of the bracket 13. The metal fitting (the inner ring 17) is joined to the bush main body 14 on an opposite side to the inverter side fixing portion 13a. The metal fitting (the inner ring 17) makes contact with the case of the inverter. That is, the metal fitting (the inner ring 17) is electrically connected to the case of the inverter. One end of the braided wire 15 is electrically and mechanically connected to the metal fitting (the inner ring 17), and the other end thereof is electrically and mechanically connected to the bracket 13.

The transmission 51 of the embodiment is a part of the body electrically, and corresponds to an example of the "vehicle" in Claims.

The specific example of the invention has been explained in detail. However, the example is for illustration only, and does not limit the scope of the claims. The technique described in the scope of the claims includes the foregoing example with various modifications and changes. Each of and various combinations of the technical elements explained in this specification and the drawings achieve technical utility, and the technical elements are not limited to the combination stated in the claims at the time of filing. The technology explained in this specification and the drawings as an example is able to achieve the plurality of objectives simultaneously, and has technical utility by achieving one of the objectives.

What is claimed is:

1. An in-vehicle structure for an inverter configured to supply electric power to a drive motor, the in-vehicle structure comprising:
    a bracket being a metal plate, the bracket being configured to fix the inverter to a vehicle;
    a damping bush being an insulator, the damping bush being fitted between the bracket and one of a case of the inverter and the vehicle; and
    a braided wire configured to electrically connect the case of the inverter to a body of the vehicle, the braided wire being wired along the metal plate of the bracket.

2. The in-vehicle structure according to claim 1, wherein:
    the damping bush is attached between the bracket and the case;
    one end of the braided wire is electrically connected to the case; and
    the other end of the braided wire is electrically and mechanically connected to the bracket.

3. The in-vehicle structure according to claim 1, wherein:
    the damping bush includes a bush main body and a metal fitting, the bush main body being an insulator, and the bush main body being attached to an end part of the bracket, the metal fitting being joined to the end part of the bracket via the bush main body, and the metal fitting making contact with the case; and
    one end of the braided wire is electrically and mechanically connected to the metal fitting.

4. The in-vehicle structure according to claim 1, wherein the braided wire is flat, and a flat surface of the braided wire faces the metal plate of the bracket.

5. A bracket unit for fixing an inverter to a vehicle, the inverter configured to supply electric power to a drive motor, the bracket unit comprising:
    a first fixing portion made of metal, the first fixing portion being fixed to one of a case of the inverter and the vehicle;
    a second fixing portion made of metal, the second fixing portion being fixed to the other one of the case and the vehicle;
    a connection portion being a metal plate, the connection portion being configured to connect the first fixing portion to the second fixing portion;
    a bush main body made of an insulator, the bush main body being attached to the first fixing portion;
    a metal fitting joined to the first fixing portion via the bush main body; and
    a braided wire configured such that one end of the braided wire is electrically and mechanically connected to any one of the first fixing portion, the second fixing portion, and the connection portion, the braided wire being configured such that the other end of the braided wire is electrically and mechanically connected to the metal fitting, and the braided wire being wired along the connection portion.

\* \* \* \* \*